(12) United States Patent
Henry

(10) Patent No.: US 8,360,461 B2
(45) Date of Patent: Jan. 29, 2013

(54) FOLDABLE STROLLER

(76) Inventor: Gilles Henry, Boulogne-Billancourt (FR)

(*) Notice: Subject to any disclaimer, the term of this patent is extended or adjusted under 35 U.S.C. 154(b) by 232 days.

(21) Appl. No.: 12/997,617

(22) PCT Filed: Jul. 3, 2009

(86) PCT No.: PCT/FR2009/000831
§ 371 (c)(1),
(2), (4) Date: Dec. 13, 2010

(87) PCT Pub. No.: WO2010/000987
PCT Pub. Date: Jan. 7, 2010

(65) Prior Publication Data
US 2011/0089670 A1 Apr. 21, 2011

(30) Foreign Application Priority Data

Jul. 4, 2008 (FR) .................................... 08 54570

(51) Int. Cl.
B62B 7/06 (2006.01)
(52) U.S. Cl. ......... 280/648; 280/647; 280/649; 280/650
(58) Field of Classification Search ............. 280/33.993, 280/47.38, 639, 642–643, 644, 647, 648, 280/649–650, 658; 297/195.13, 218.1, 218.2, 297/218.3, 219.12, 440.11
See application file for complete search history.

(56) References Cited

U.S. PATENT DOCUMENTS

| | | | |
|---|---|---|---|
| 2,483,309 A * | 9/1949 | Amaducci | 297/54 |
| 5,246,265 A * | 9/1993 | Nagan et al. | 297/54 |
| 7,328,953 B2 * | 2/2008 | Werschmidt | 297/354.13 |
| 2004/0222615 A1 | 11/2004 | Cheng et al. | |
| 2005/0098983 A1 | 5/2005 | Cheng et al. | |
| 2007/0132207 A1 | 6/2007 | Moriguchi et al. | |
| 2007/0246916 A1 | 10/2007 | Hou | |
| 2009/0302577 A1 * | 12/2009 | Ageneau et al. | 280/642 |

FOREIGN PATENT DOCUMENTS
FR 2 553 362 A1 4/1985

OTHER PUBLICATIONS

International Search Report w/translation from PCT/FR2009/000831 dated Oct. 28, 2009 (6 pages).

* cited by examiner

Primary Examiner — J. Allen Shriver, II
Assistant Examiner — James Triggs
(74) Attorney, Agent, or Firm — Osha • Liang LLP

(57) ABSTRACT

A foldable stroller that moves between an extended position and stowed position, and which comprises a seat portion, a back, at least three legs, and a rear linkage including at least one rear leg, a front linkage including at least one front leg, a back linkage including at least one back mount and a seat portion mounting and when moving the stroller from the extended position to the stowed position, the lower end of the back leg tilts forward the lower end of the front leg tilts backward, the back is folded against the seat portion, the upper edge of the back coming opposite the front end of the seat portion mounting and the upper end of the front leg.

16 Claims, 5 Drawing Sheets

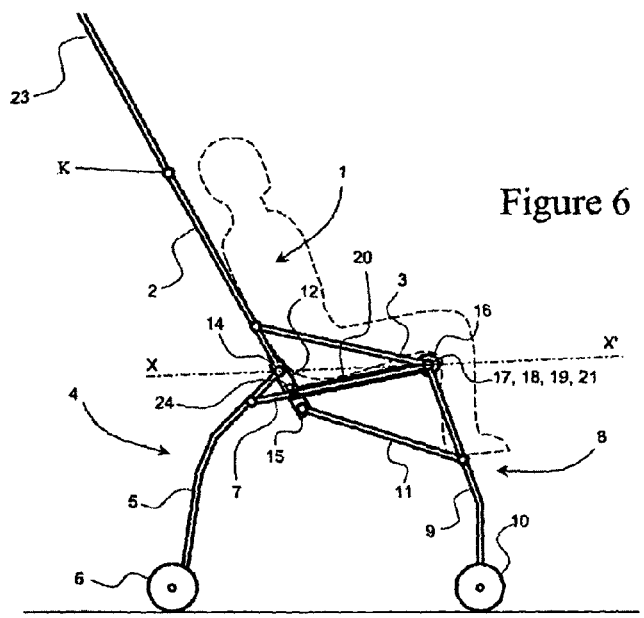
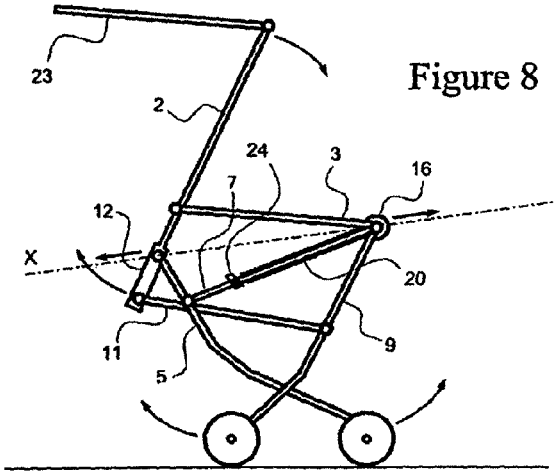
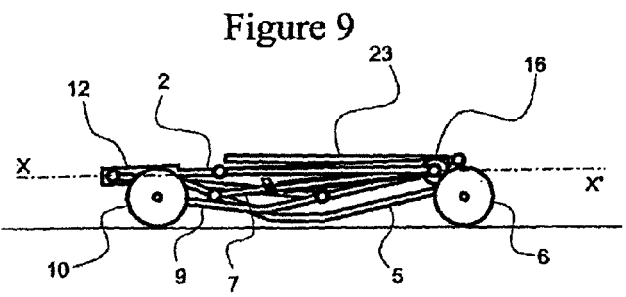
Figure 6
Figure 7
Figure 8
Figure 9

FOLDABLE STROLLER

The invention relates to a foldable stroller that can move between an unfolded position and a folded position.

In the prior art there are many types of foldable strollers. Such strollers generally comprise a backrest, a seat portion pivotally linked to the backrest, and three or four legs, mounted with wheels.

The ergonomics of a child stroller necessitate that the length of the longitudinal support of the seat portion be notably shorter than the height of the backrest, and also shorter than the length of the legs. Therefore, due to these characteristics, strollers in the prior art remain relatively bulky when folded, as it will be explained hereafter.

As a consequence, the solutions in the prior art are not fully satisfying when complying with the characteristics of a child stroller.

Patent application FR 2 553 362 illustrates an example of a stroller in the prior art. This document describes a foldable stroller comprising a seat portion, a backrest and four legs. The stroller comprises a rear linkage, a front linkage, a backrest linkage and a seat support. The stroller described in this document is relatively bulky when in a folded position. Indeed, the upper end of the handlebar folds against the front edge of the seat support, and against the upper end of the front leg. Therefore, in folded position, the biggest dimension of the stroller according to this document is nearly equal to the length of the handlebar, which remains relatively bulky. Furthermore, in this document, the rear and front wheels come against each other when the stroller is folded, making the stroller relatively large at the level of the wheeled means when the stroller is folded.

The present invention intends to remedy such inconveniences by proposing an ergonomic stroller occupying a small space when in a folded position, and for which folding and unfolding operations are simple.

For this purpose and according to a first aspect, the invention relates to a foldable child stroller, mobile from an unfolded position to a folded position, and comprising a seat portion, a backrest, and at least three legs, and:
- a rear linkage including at least one rear leg having an upper end and a lower end mounted with a wheeled means;
- a front linkage including at least one front leg having an upper end and a lower end mounted with a wheeled means;
- a backrest linkage including at least one backrest mount; and
- a seat support including a front edge and a rear end, and having a length shorter than the height of the backrest.

The front linkage, the rear linkage, the backrest linkage and the seat support are articulated one to another, and configured so as to ensure simultaneously, when the stroller is moved from its unfolded position to its folded position:
- the forward hinging of the lower end of the rear leg, until said lower end of the rear leg reaches a position next to the upper end of the front leg,
- the backward hinging of the lower end of the front leg, until said lower end of the front leg reaches a position next to the upper end of the rear leg, and
- the folding of the backrest against the seat portion, until the upper end of the backrest mount reaches a position next to the front edge of the seat support, and to the upper end of the front leg.

The foldable stroller resulting from such construction is compact, as its longest dimension is roughly equal to the length of the backrest mount.

Indeed, as the upper end of the backrest mount, in the folded position, comes next to the front edge of the seat support, despite the different dimensions of the seat support and the backrest, and as the upper end of the front leg, whose length is shorter than the backrest height, is positioned next to the upper end of the backrest mount, therefore the longest dimension of the stroller in the folded position is the height of the backrest. Of course, in the present description, the height of the backrest is to be considered as the height of the backrest itself, and does not include any potential extension (e.g. a handlebar mounted on the backrest mounts).

Advantageously, the height of the backrest being the largest dimension of the stroller in the folded position, is nearly equal to the height of the rear leg, taken as the distance between the rim of the rear wheeled means and the intersection of the backrest with the seat portion, in the unfolded position.

Moreover, the stroller can be easily moved from its unfolded position to its folded position, as the movement of the legs and of the backrest are conducted jointly, in one single step.

Furthermore, the rear and front legs go past each other during the movement of the stroller to its folded position, so that the wheels are positioned at opposite ends of the stroller in folded position. As a consequence, in folded position, the wheels mounted on the front and rear legs are not positioned next to each other, which would result in increasing the space of the stroller at the level of the wheeled means. Generally speaking, this specific movement of the legs contributes, when combined with the other characteristics of the invention, to the compactness of the stroller in the folded position.

In an advantageous embodiment, the rear end of said seat support is articulated with the backrest mount through at least two degrees of freedom. Therefore, the seat support is not pivotally linked to the backrest, but articulated with the backrest through at least two degrees of freedom, so as to enable the front edge of the seat support to reach the upper end of the backrest, despite the length of the backrest being longer than the seat support.

Advantageously, the stroller comprises three sub-assemblies:
- the first sub-assembly comprises a backrest linkage, including a backrest mount and a backrest longitudinal rod, hinged to said backrest mount around a transverse rotation axis;
- the second sub-assembly comprises a rear linkage, including at least one rear leg and a rear longitudinal rod, hinged to said rear leg around a transverse rotation axis;
- the third sub-assembly comprises a front linkage, including at least one front leg and a front longitudinal rod, hinged to said front leg around a transverse rotation axis.

In addition, the stroller comprises a rear hinge body and a front hinge body;
- the rear hinge body comprising at least one transversal hinge, for the pivoting of the rear leg and of the front rod relatively to the backrest mount;
- the front hinge body comprising at least one transversal hinge, for the pivoting of the backrest longitudinal rod, of the rear rod, and of the seat support relatively to the front leg.

Moreover, the front edge of the seat support is mounted on the front hinge body.

Advantageously, as aforementioned, the rear end of the seat support is connected to one point of the linkage, but is not pivotally mounted on the backrest mount.

According to the invention, the movement of the stroller between its unfolded position and its folded position is simple, as the separation or the bringing together of the two rear and front hinge bodies, along an axis, results in the folding of the legs, of the backrest and of the seat portion, or respectively in their unfolding.

In one embodiment of the invention, the seat support is carried by the rear longitudinal rod.

Advantageously, the rear hinge body is an extension of the lower portion of the backrest mount, and the hinge of the backrest mount with said front longitudinal rod is located below the seat when the stroller is in the unfolded position.

In this way, the front longitudinal rod can be connected to a cross member connected to the front leg, at a distance appropriate for making a footrest for the stroller.

Advantageously, the linkage of the stroller includes at least one locking means of the stroller in the unfolded position, based on one element of the seat (rear rod, seat support or seat portion) interacting with the backrest or the rear hinge body, in a locking position.

In a second embodiment:
the front hinge body and the rear hinge body are interconnected through guiding means, sliding longitudinally with respect to each other; and
the seat support is carried by the front hinge body.

The foldable stroller according to the invention can comprise three or four legs.

When the stroller comprises four legs, it can include a cross member between the front legs. In this case, the rear legs will advantageously be bent, in order to go around said cross member in folded position.

In a preferred embodiment, the backrest mount is continued by a guiding mount. The guiding mount is pivotally or slidably mounted on the backrest mount. Therefore, the guiding means generates very little or no additional space for the stroller in folded position.

Advantageously, the front edge of the seat support is connected to the upper end of the front leg.

Exemplary embodiments, showing additional purposes and advantages of the invention, will now be described in relation to the annexed drawings, in which:

FIG. 6 is a schematic lateral view of a foldable stroller linkage according to a first embodiment of the invention, in an unfolded position;

FIGS. 7 and 8 are schematic lateral views of a foldable stroller linkage according to the first embodiment of the invention, in intermediate positions;

FIG. 9 is a schematic lateral view of a foldable stroller linkage according to the first embodiment of the invention, in folded position;

FIGS. 1a and 1b illustrate the folding of a stroller according to a first principle frequently met in the prior art.

Figure 1A:
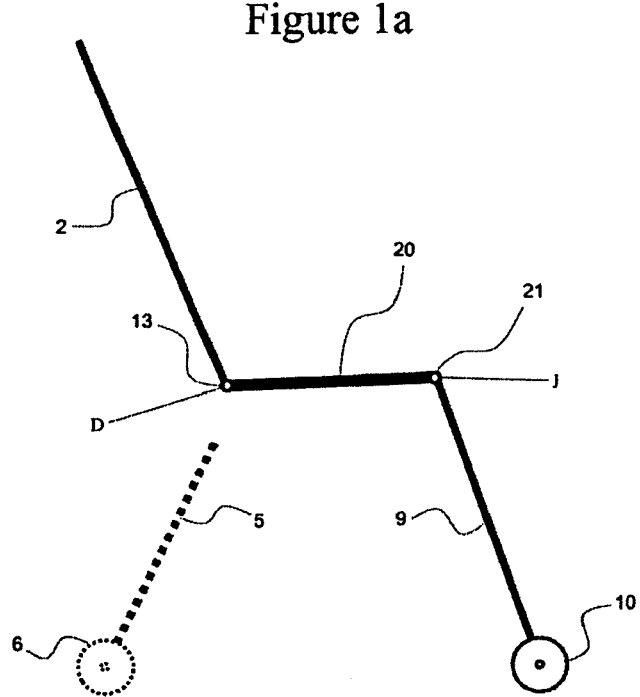
FIGS. 1a and 1b are schematic lateral views of a first example of prior art, in unfolded and folded positions.

When the linkage of the stroller is considered in a lateral view, it notably comprises a backrest mount 2, a seat support 20 and a front leg 9. The seat support 20 is pivotally mounted on the backrest mount 2 around an axis D, as well as on the front leg 9 around an axis J.

Moreover, the linkage of the stroller comprises a rear leg 5. Each of the legs 5, 9 is equipped with a wheeled means 6, 10.

Figure 1B:
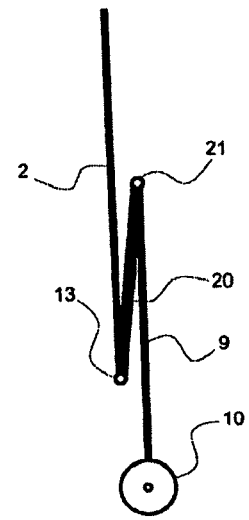

In order to obtain a flat folding of the stroller (FIG. 1b), the seat support 20 collapses on the backrest mount 2, and the front leg 9 collapses against the seat support 20.

We see that this first type of structure does not allow a very compact folding for a child stroller. Indeed, the ergonomics of a child stroller necessitate that the length of the longitudinal seat support 20 be notably shorter than the height of the backrest mount 2, and also shorter than the length of the front leg 9 (distance between axis J and the wheeled means 10). In the folded position, the front edge of the seat support 20 is therefore collapsed on a point distant from the upper end of the backrest mount 2. As a consequence, the lower end of the front leg 9 extends beyond the backrest mount 2. The total length of the folded stroller is therefore notably longer than the height of the backrest mount 2.

Figure 2A:
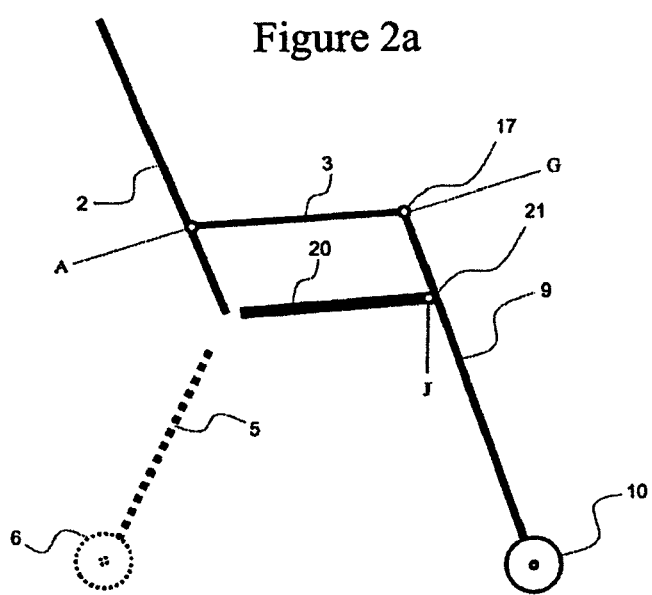
FIGS. 2a and 2b are schematic lateral views of a second example of prior art, in unfolded and folded positions.
Figure 2B:
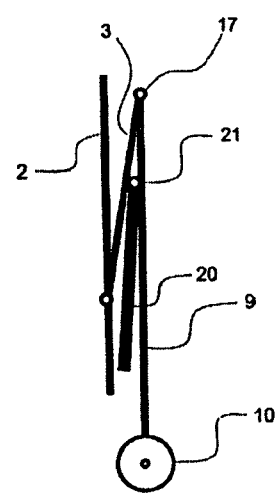

FIGS. 2a and 2b illustrate the folding of a stroller according to a second principle frequently met in the prior art, sometimes in combination with the previous principle.

When the stroller linkage is considered in a lateral view, it notably comprises a backrest mount 2, a seat support 20, a front leg 9 and an armrest support 3.

The armrest support 3 is pivotally mounted on the backrest mount 2 around an axis A, as well as on the upper end of the front leg 9 around an axis G.

The front edge of the seat support 20 is pivotally mounted on the front leg 9 around an axis J, located below axis G. The rear edge of the seat support 20 is connected to another point—not represented—of the stroller linkage.

The figure formed by the armrest support 3, the seat support 20, the backrest mount 2 and the front leg 9, is a distortable parallelogram or pseudo-parallelogram.

Moreover, the stroller linkage comprises a rear leg 5.

When the stroller is a child stroller, each of the legs 5, 9 is equipped with a wheeled means 6, 10.

In order to obtain a flat folding of the stroller (FIG. 2b), the armrest support 3 collapses on the backrest mount 2. The seat support 20 and the front leg 9 both also collapse, roughly parallel to the backrest mount 2.

We see that this second type of structure does not allow either a very compact folding for a child stroller. Indeed, even if the armrest support 3 collapses on the upper end of the backrest mount 2, the front edge of the seat support 20 is once again collapsed on a point distant from said upper end of the backrest mount 2. As a consequence, the lower end of the front leg 9 extends beyond the backrest mount 2, and the total length of the folded stroller is once again notably longer than the height of the backrest mount 2.

Figure 3:
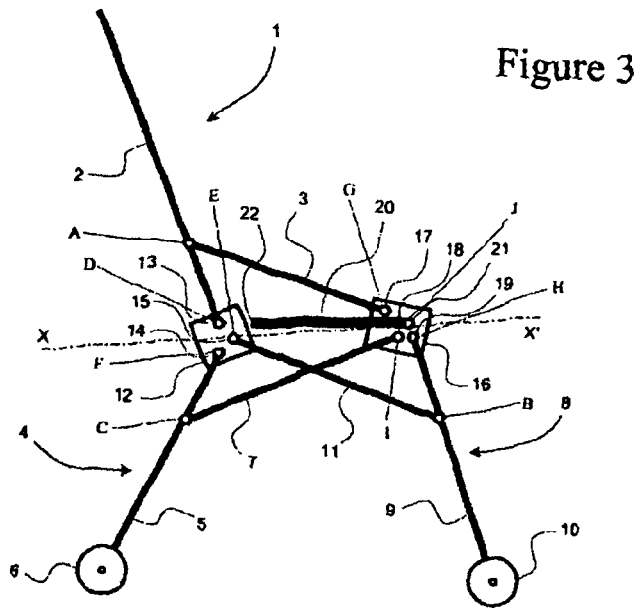
FIG. 3 is a lateral view of the principle of a stroller linkage according to the invention, in an unfolded position.
Figure 4:
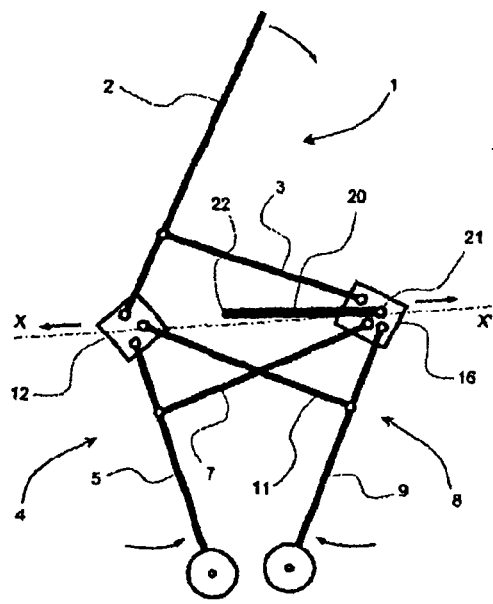
FIG. 4 is a lateral view of the principle of a stroller linkage according to the invention, in an intermediate position.
Figure 5:
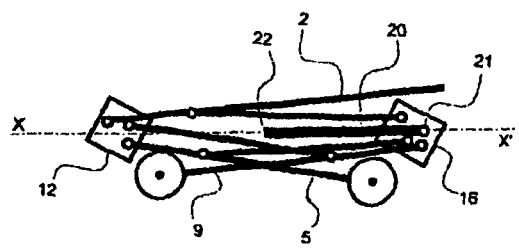
FIG. 5 is a lateral view of the principle of a stroller linkage according to the invention, in a folded position.

In order to remedy such inconveniences, FIGS. 3 to 5 illustrate the folding of a self-carrying stroller, adapted for carrying and displacing a child, that is very compact when folded.

When the stroller linkage is considered in a lateral view, it is made up of the three sub-assemblies 1, 4, 8, described hereunder.

The first sub-assembly consists of a backrest linkage 1, comprising a backrest mount 2 and a backrest longitudinal rod 3. The second sub-assembly consists in a front linkage 8, comprising a front leg 9 and a front longitudinal rod 11. The third sub-assembly consists in a rear linkage 4, comprising a rear leg 5 and a rear longitudinal rod 7.

Moreover, a seat linkage comprises a seat support 20, which can be advantageously rigid or semi-rigid. The length of the seat support 20 is notably shorter than the height of the backrest. The length of the seat is less than 70% of the backrest height, preferably less than 60% of the backrest height, and about 55% of the backrest height.

It should be noted that according to the invention, the front legs 9 and the rear legs 5 are in upright position, and do not cross, when the stroller is in an unfolded position.

It is also to be noted that the length of the front legs 9 and of the rear legs 5 is roughly similar to the height of the backrest 2.

The backrest longitudinal rod 3 is pivotally mounted on the backrest mount 2, around an axis A. The front longitudinal rod 11 is pivotally mounted on the front leg 9, around an axis B. The rear longitudinal rod 7 is pivotally mounted on the rear leg 5, around an axis C.

Moreover, the stroller comprises a front hinge body and a rear hinge body.

The rear hinge body comprises a rear rigid support 12, carrying a hinge 13 for the backrest 2 around a rotation axis D, a hinge 15 for the front rod 11 around a rotation axis E, and a hinge 14 for the rear leg 5 around a rotation axis F.

The front hinge body comprises a front rigid support 16, carrying a hinge 17 for the backrest rod 3 around a rotation axis G, a hinge 19 for the front leg 9 around a rotation axis H, a hinge 18 for the rear rod 7 around a rotation axis I, and a hinge 21 for the seat support 20 around a rotation axis J. The hinge 19 is located at the upper end of the front leg 9. The seat support 20 is therefore connected to the front leg 9, close to its upper end. In other words, the front leg 9 is pivotally mounted on the front hinge body, close to the hinge 21 of the seat support 20 on the front hinge body.

The rear end 22 of the seat support 20 is connected to another element of the stroller linkage, by means not represented here. In order for the stroller to fold, such seat support 20 is not a rigid body pivotally mounted on the lower portion of the backrest mount 2.

The front support 16 and the rear support 12 are located on the axis X-X', and move away from each other along this axis when the stroller is moved from its unfolded position (FIG. 3) to its folded position (FIG. 5).

Moreover, the front support 16 and the rear support 12 are equipped with locking means, not represented. In the unfolded position, the locking means prevent the movement of the rear support 12 relatively to the front support 16, along the axis X-X', and also prevent their rotation.

When the locking means are disengaged, the stroller may then be moved from its unfolded position to its folded position. In order to achieve this, the front support 16 and the rear support 12 are moved away from each other, along the axis X-X'. This results in the distortion and then the flattening of the hinged linkage 1 holding the backrest 2 extended, of the hinged linkage 4 holding the rear leg 5 extended, and of the hinged linkage 8 holding the front leg 9 extended.

Therefore, when the front support 16 and the rear support 12 are moved away from each other along the axis X-X', the lower end of the front leg 9 hinges backward due to the action of the front rod 11, the lower end of the rear leg 5 hinges forward due to the action of the rear rod 7, and the backrest mount 2 hinges forward against the seat portion due to the action of the backrest rod 3. Moreover, the projection on axis X-X' of the rear end 22 of the seat support 20 moves away from the rear support 12.

During the motion of the stroller between its unfolded position and its folded position, the front leg 9 and the rear leg 5 go past each other. Therefore, in folded position, the lower end of the front leg 9 comes next to the upper end of the rear leg 5, and the lower end of the rear leg 5 comes next to the upper end of the front leg 9. Obviously, in order to allow the front leg 9 and the rear leg 5 to go past each other, the front and rear legs are not located in the same lateral plane.

Advantageously, the rear legs 5 expand in lateral planes located between the lateral planes where the front legs 9 are lying, so that the rear legs 5 can go between the front legs 9 when the stroller is moved to its folded position. It should be noted that the rear legs 9 are preferably interconnected by a cross member, extending close to the rotation axis of the wheels, and which helps in rigidifying this sub-assembly. It is therefore important, in such case, that the rear legs 9 are the ones that go between the front legs 5 when the stroller is moved from its unfolded position to its folded position. Moreover, it should be noted that when the front legs 5 are interconnected by a cross member 28 forming a footrest, the rear legs 9 are bent, in order to go round the cross member 28 when the stroller is in folded position.

When the stroller is in folded position (FIG. 5), the backrest mount 2, the rear leg 5, the front leg 9 and the seat support 20 are positioned roughly parallel to axis X-X', and close to it, so that the overall linkage occupies a reduced space. It should be noted that the wheels mounted on the front legs 9 and the rear legs 5 are positioned at opposite sides of the folded stroller. The wheeled means on the front leg 9 is positioned towards the rear portion of the folded stroller, and the wheeled means on the rear leg is positioned towards the front portion of the folded stroller.

Moreover, in order to enhance the compactness of the stroller in the folded position, the various hinges of the linkage shall be preferably positioned so that the front edge of the seat support 20, and therefore the upper end of the front leg 9, collapses roughly against the upper edge of the backrest 2.

Alternatively, it is possible to obtain a similar folding of the stroller by acting directly on any of the linkage sub-assemblies, for example by folding down the backrest 2 towards the front rigid support 16, by folding the front leg 9 towards the back, or by folding the rear leg 5 towards the front.

Obviously, in order to allow such movement, the front leg 9 and the front rod 11 on one hand, the rear leg 5 and the rear rod 7 on the other hand, should not be positioned in the same lateral plane.

In the depicted embodiment, each one of the legs 5, 9 is equipped with a wheeled means 6, 10 fixed at the lower end of the leg 5,9 in order to support the stroller.

When the stroller is developed in the third dimension, according to an axis perpendicular to the plane of FIGS. 3 and 4, the backrest mount 2 should preferably be doubled, notably for supporting the backrest of the stroller, and also to serve as steering means for the stroller.

Similarly, the stroller comprises two parallel rear legs 5.

The front leg 9 and its wheeled means 10 can be either single, in order to build a three-wheeled stroller, or doubled in order to build a four-wheeled stroller.

Moreover, in a preferred embodiment, the foldable stroller comprises a pair of front rods 11, of rear rods 7 and/or backrest rods 3, extending on both sides of the seat and of the backrest, in order to reinforce the structure of the foldable stroller. Moreover, in an embodiment, the backrest rods 3 provide lateral restraint for the passenger.

FIGS. 6 to 10 illustrate stroller linkage according to a first embodiment of the invention.

In this embodiment, the rear rigid support 12 is located as an extension of the lower portion of the backrest mount 2, and is fixly mounted to said backrest mount 2. As indicated previously, the rear support 12 carries a hinged pivot 14 for the rear leg 5, and a hinged pivot 15 for the front longitudinal rod 11.

Moreover, at the level of the front hinge body, the backrest rod 3, the rear rod 7 and the front leg 9 are pivotally mounted according to a single axis perpendicular to the plane of FIGS. 6 to 8.

In this embodiment, the seat support 20 is merged with the rear rod 7.

Moreover, in this embodiment, we see that the length of the backrest rod 3 is roughly equal to the distance between axis A and the upper end of the backrest mount 2.

The backrest 25 is fixly mounted on the backrest mount 2. The seat 26 is fixly mounted on the seat support 20. For example, the seat 26 and the backrest 25 can be made out of one single flexible fabric, or can be made out of several flexible, rigid or semi-rigid elements.

Figure 10:
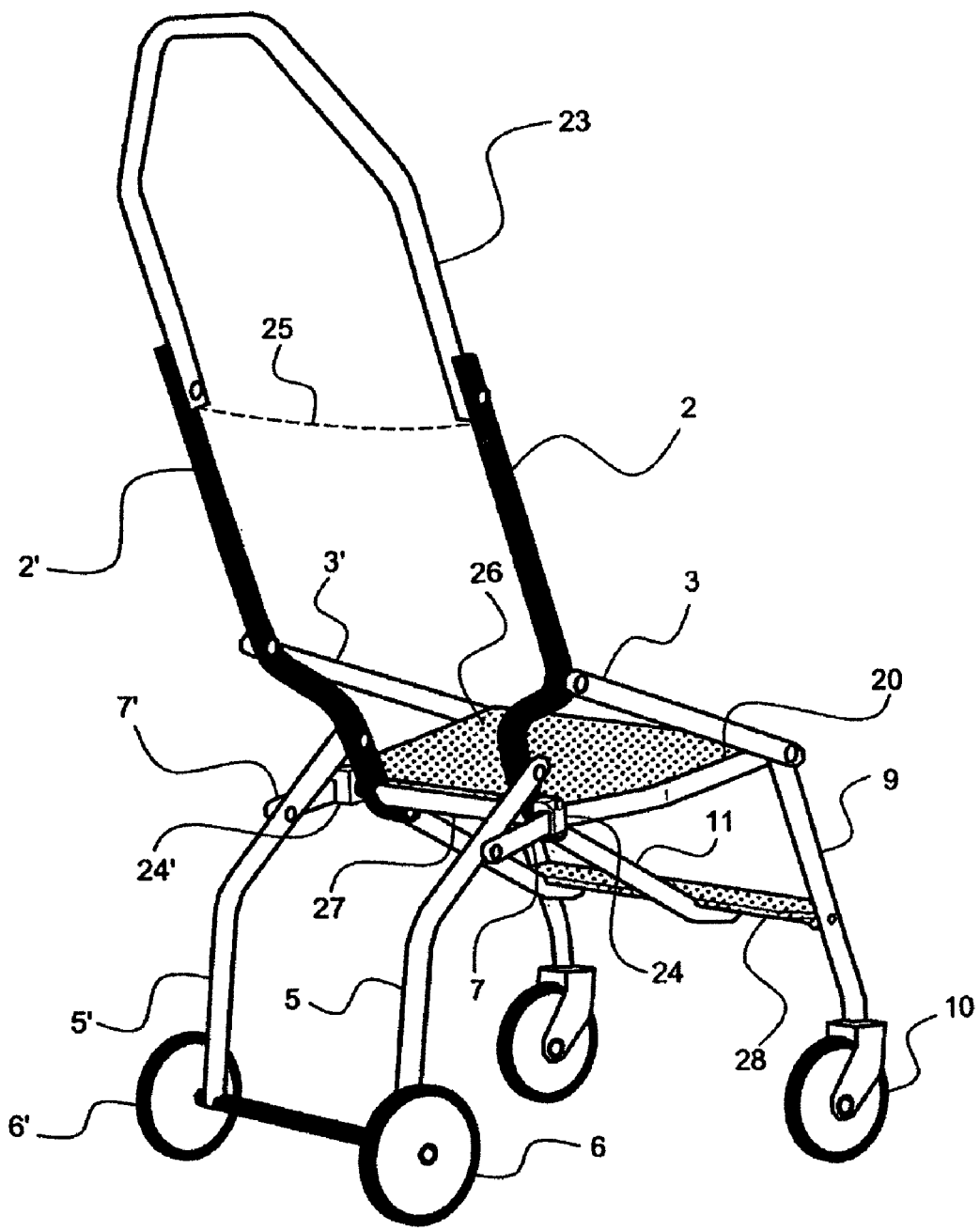
FIG. 10 is a perspective view of a foldable stroller illustrating the first embodiment, in an unfolded position.

The backrest mounts 2, 2' are interconnected by a backrest cross member 27 (FIG. 10).

The linkage is equipped with one or a plurality of locking means 24, allowing the locking of the stroller in the unfolded position (FIGS. 6 and 10). The locking means consists for example in a friction system or a catch mechanism. As depicted in FIGS. 6 to 10, the locking means 24 is positioned in order to block the rear rod 7 on the lower end of the backrest mount 2 carrying the rear support 12. For this purpose, the locking means 24 could be integral with the rear rod 7 (depicted embodiment) or with the rear support 12.

Other embodiments, not depicted, could have the same result, for example a locking means 24 blocking the backrest cross member 27 on the seat 26, or also the rear support 12 on the seat 26.

Moreover, in order to reinforce the structure of the stroller, it comprises a horizontal cross member 28 depicted in FIG. 10, connecting the front legs 9 and supporting a footrest for the stroller. In lateral view, this footrest is roughly horizontal when the stroller is in the unfolded position.

Advantageously, the front rod 11 is connected to said cross member 28. For this purpose, as depicted in FIGS. 6 to 10, the rear hinged body is a lower extension of the backrest mount 2, below the seat support 20 when the stroller is in unfolded position, and the hinge 15 connecting the backrest mount 2 to the front rod 11 is located at the lower end of the backrest mount 2. Therefore, the cross member 28 is positioned at a height appropriate for supporting the footrest.

Figure 11:
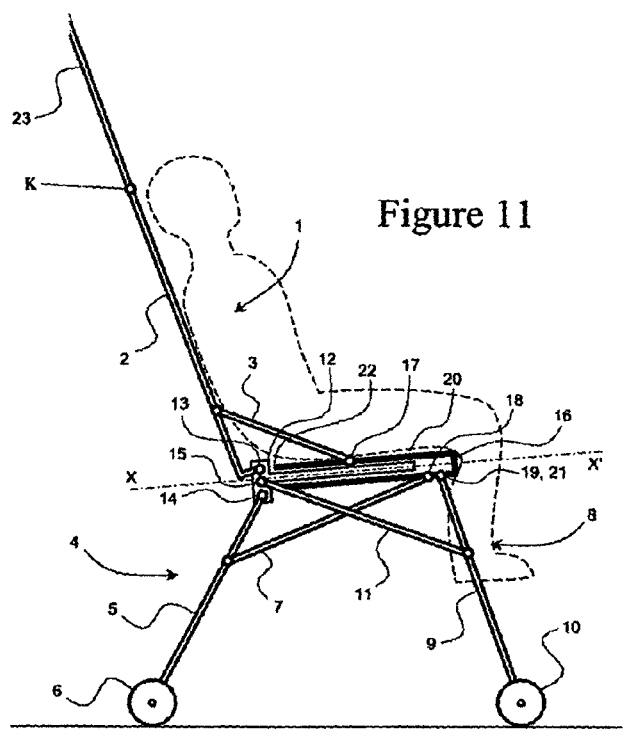
FIG. 11 is a schematic lateral view of a foldable stroller linkage according to a second embodiment of the invention, in an unfolded position.
Figure 12:
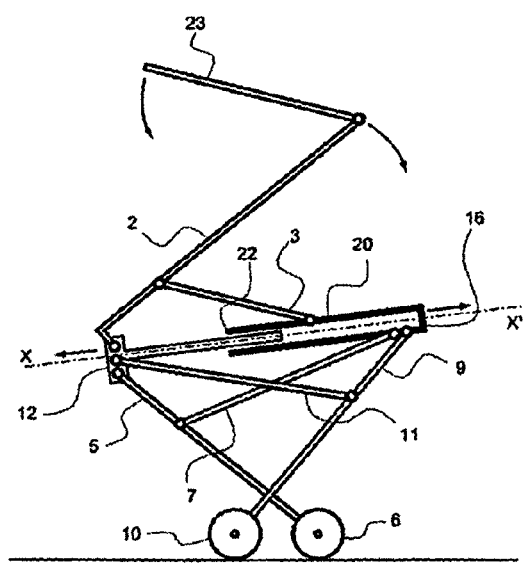
FIG. 12 is a schematic lateral view of a foldable stroller linkage according to the second embodiment of the invention, in an intermediate position.
Figure 13:
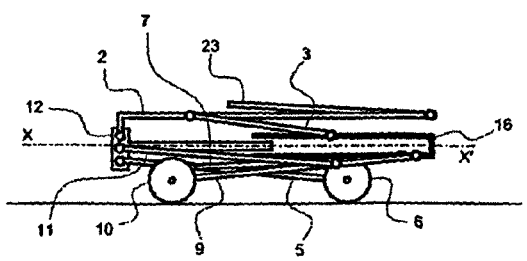
FIG. 13 is a schematic lateral view of a foldable stroller linkage according to the second embodiment of the invention, in a folded position.

FIGS. 11 to 13 illustrate a second embodiment of the invention.

In this embodiment, the front hinge body and the rear hinge body are respectively supported by a front support 16 and a rear support 12. The front support 16 comprises the transversal hinges 17, 18, 19 for the pivoting of the backrest rod 3, the rear rod 7 and the front leg 9. The rear support 12 comprises the transversal hinges 13, 14, 15 for the pivoting of the backrest mount 2, the rear leg 5 and the front rod 11. The front support 16 and the rear support 12 are slidably mounted on one another.

Moreover, in this embodiment, the seat support 20 is merged with the front support 16.

As an example, in the depicted embodiment, the front support 16 and the rear support 12 consist in two half-frames slidably mounted on one another. For this purpose, the interior of the front support 16 is designed to form a sliding guide for the rear support 12.

In an advantageous alternative to the invention applicable to the embodiments previously described, the linkage may be equipped with drawback means, positioned so that the linkage automatically folds or unfolds. The elastic drawback means may notably consist in traction, compression or torsion springs.

The drawback means may notably consist of one or a plurality of torsion springs positioned at the level of one of the rotation axis of the stroller linkage, or—for the second embodiment—a compression or traction spring conducting the sliding movement of the front support 16 relatively to the rear support 12.

In a preferred embodiment, the linkage also includes a guiding mount for the stroller. As depicted in FIGS. 6, 10 and 11, when the stroller is in the unfolded position, the guiding mount 23 extends roughly in the continuity of the backrest mount 2, and allows the person positioned at the rear of the stroller to guide it. The guiding mount 23 is pivotally mounted on the backrest mount 2, around an axis K located close to the upper end of said backrest mount 2. The pivot is equipped with a blocking means for the guiding mount 23, according to several blocking positions, in order to adapt to the height of the person guiding the stroller.

During the folding, as depicted in FIGS. 7 to 9, 12 and 13, the guiding mount 23 folds backwards against the backrest mount 2. Therefore, the length of the stroller in folded position remains notably equal to the length of the backrest mount 2.

In another embodiment, not depicted, it is possible to obtain the same result with a guiding mount 23 slidably mounted relatively to the backrest mount 2. In this case, locking means such as a catch system allow the blocking of the sliding movement of the guiding mount 23 relatively to the backrest mount 2.

Therefore, in view of the invention described above, it is possible to obtain a structure with a particularly compact linkage, its longest dimension once folded being roughly equal to the length of the backrest mount 2. Moreover, this linkage has the advantage of being unfolded easily.

The invention is described hereabove as an example. It should be understood that those skilled in the art are liable to bring variations in the embodiment of the invention without leaving the scope of the invention.

It should be noted for example that this type of linkage can easily adapt to other types of strollers, e.g. a twin stroller, a toy stroller, a stroller for disabled persons, or other self-carrying carts.

The invention claimed is:

1. A foldable stroller, mobile from an unfolded position to a folded position, comprising:
   a seat portion;
   a backrest;
   at least three legs;
   a rear linkage including at least one rear leg having an upper end and a lower end mounted with a wheeled means;
   a front linkage including at least one front leg having an upper end and a lower end mounted with a wheeled means;
   a backrest linkage including at least one backrest mount; and
   a seat support including a front edge and a rear end, and having a length shorter than the height of the backrest, wherein the front linkage, the rear linkage, the backrest linkage and the seat support are articulated one to another, and configured so as to ensure simultaneously, when the stroller is moved from the unfolded position to the folded position:

forward hinging of the lower end of the rear leg, until said lower end of the rear leg reaches a position next to the upper end of the front leg, backward hinging of the lower end of the front leg, until said lower end of the front leg reaches a position next to the upper end of the rear leg, and folding of the backrest against the seat portion, until the upper end of the backrest mount reaches a position next to the front edge of the seat support, and to the upper end of the front leg.

2. The foldable stroller according to claim 1, wherein the rear end of said seat support is articulated with the backrest mount through at least two degrees of freedom.

3. The foldable stroller according to claim 1, wherein the foldable stroller further comprises:

a first sub-assembly comprising a backrest linkage, including a backrest mount and a backrest longitudinal rod, hinged to said backrest mount around a transverse rotation axis;

a second sub-assembly comprising a rear linkage, including at least one rear leg and a rear longitudinal rod, hinged to said rear leg around a transverse rotation axis;

a third sub-assembly comprising a front linkage, including at least one front leg and a front longitudinal rod, hinged to said front leg around a transverse rotation axis; and a rear hinge body and a front hinge body, wherein the rear hinge body comprising at least one transversal hinge, for the pivoting of the rear leg and of the front rod relative to the backrest mount;

the front hinge body comprising at least one transversal hinge, for the pivoting of the backrest rod, of the rear rod, and of the seat support relatively to the front leg; and the transversal hinge of the seat support is located at the upper end of the front leg.

4. The foldable stroller according to claim 3, wherein the seat support is carried by the rear rod(s).

5. The foldable stroller according to claim 4, wherein the rear hinge body is an extension of the lower portion of the backrest mount, below the seat when the stroller is in the unfolded position.

6. The foldable stroller according to claim 5, wherein the rear rod includes at least one locking means of the stroller in the unfolded position, interacting with the rear hinge body, in a locking position.

7. The foldable stroller according to claim 4, wherein the hinge of the backrest mount with said front longitudinal rod is located below the seat support when the stroller is in the unfolded position.

8. The foldable stroller according to claim 3, wherein:

the front hinge body and the rear hinge body are interconnected through guiding means, sliding longitudinally with respect to each other; and the seat support is carried by the front hinge body.

9. The foldable stroller according to claim 1, wherein the stroller comprises four legs.

10. The foldable stroller according to claim 9, wherein the stroller comprises a cross member connecting the front legs, making a footrest.

11. The foldable stroller according to claim 10, wherein the front rod(s) is pivotally mounted on said cross member connecting the front legs.

12. The foldable stroller according to claim 1, wherein the stroller comprises three legs.

13. The foldable stroller according to claim 1, wherein the backrest is continued by a guiding mount.

14. The foldable stroller according to claim 13, wherein said guiding mount is pivotally or slidably mounted on the backrest.

15. The foldable stroller according to claim 1, wherein the length of the seat support is less than 60% of the backrest height.

16. The foldable stroller according to claim 1, wherein the front end of the seat support is connected to the upper end of the front leg.

* * * * *